May 23, 1933. H. C. LIMA 1,910,026
SELF LOADING TRUCK
Filed Jan. 6, 1931 6 Sheets-Sheet 1

Fig. 1.

WITNESS
Oliver W. Holmes

Inventor
HENRY C. LIMA
By his ATTORNEYS Knight Bros.

May 23, 1933.  H. C. LIMA  1,910,026
SELF LOADING TRUCK
Filed Jan. 6, 1931   6 Sheets-Sheet 2

Inventor
HENRY C. LIMA
BY his ATTORNEYS Knight Bros.

WITNESS
Oliver W. Holmes

May 23, 1933.  H. C. LIMA  1,910,026
SELF LOADING TRUCK
Filed Jan. 6, 1931  6 Sheets-Sheet 4

Inventor
HENRY C. LIMA
By his Attorneys
Knight Bros

WITNESS

May 23, 1933.  H. C. LIMA  1,910,026
SELF LOADING TRUCK
Filed Jan. 6, 1931   6 Sheets-Sheet 5

Inventor
HENRY C. LIMA
By his Attorneys

Patented May 23, 1933

1,910,026

UNITED STATES PATENT OFFICE

HENRY C. LIMA, OF STAMFORD, CONNECTICUT, ASSIGNOR TO SANITARY AUTO BODY CORPORATION, OF BROOKLYN, NEW YORK, A CORPORATION

SELF-LOADING TRUCK

Application filed January 6, 1931. Serial No. 506,891.

This invention constitutes in part a continuation of my application Serial No. 337,543 which was filed in my name under date of February 5, 1929, and relates more especially to self-loading trucks in which a load-carrying member or support is raised from the ground at the rear end of a truck; moved forwardly into or above said truck for depositing the load on or in said truck; and again returned to the rear end of the truck to be again lowered for another load.

The primary object of my invention is to provide hoisting and conveying mechanism of improved construction for use on a truck; an improved arrangement of this hoisting and conveying mechanism with respect to the truck; and improved operating connections for driving and automatically controlling said hoisting and conveying mechanisms. For this purpose, my invention contemplates more particularly a self-loading truck comprising a truck body, a traveling crane with a longitudinally movable carriage and hoisting mechanism mounted thereon, power connections adapted to be alternately connected to said carriage and hoisting mechanism, means under the control of said carriage for automatically disconnecting said power connections from said carriage and connecting said power connections to said hoisting mechanism at one extreme of the movement of said carriage, means operated by the carriage for reversing the driving connections at the other extreme of the movement of said carriage, means for automatically discharging the load and means for disconnecting the power connections at the end of the lowering movement of said hoisting mechanism. A further object of my invention is to provide an improved construction for conveyor mechanism of the traveling crane type whereby the loaded conveyor is adapted to automatically reverse itself, the driving connections of said conveyor being preferably rendered non-reversible by the operator after he starts it from loading position until the time when said conveyor reverses itself.

One of the objects of my invention is to provide mechanism of improved construction which upon being set in motion from load receiving or load attaching position, continues in motion until loading position is again reached, the load being automatically deposited in the truck in the meantime. Preferably, my invention contemplates the discharge or disconnection of the load after the conveyor has reached a predetermined position in its forward travel.

More specifically, my invention contemplates loading and conveyor mechanism of the traveling crane type adapted to self-loading trucks for general commercial purposes such for example as the transportation of sand, building materials, and goods of other kinds from one place to another. It furthermore contemplates a substantially closed dust-proof and non-leakable body suitable for the collection and removal of garbage, ashes, snow, refuse, etc., for which purpose it is advantageous to employ a large closed-in body constructed of steel and provided with upper and lower swinging doors, the former being preferably constructed and arranged to be opened by the conveyor or receptacle when it moves outwardly to be lowered to loading position and closed again as the loaded receptacle is moved forwardly into the truck body and the latter being suitably constructed, arranged and connected up to remain closed until the truck body is elevated for dumping a load when said lower door is automatically released to swing to open position for this purpose and again locked as soon as the truck body is lowered to normal position.

Minor features of construction will be explained in the specification and recited in the appended claims, reference being had to the accompanying drawings which illustrate my invention in a preferred embodiment.

Figure 1:
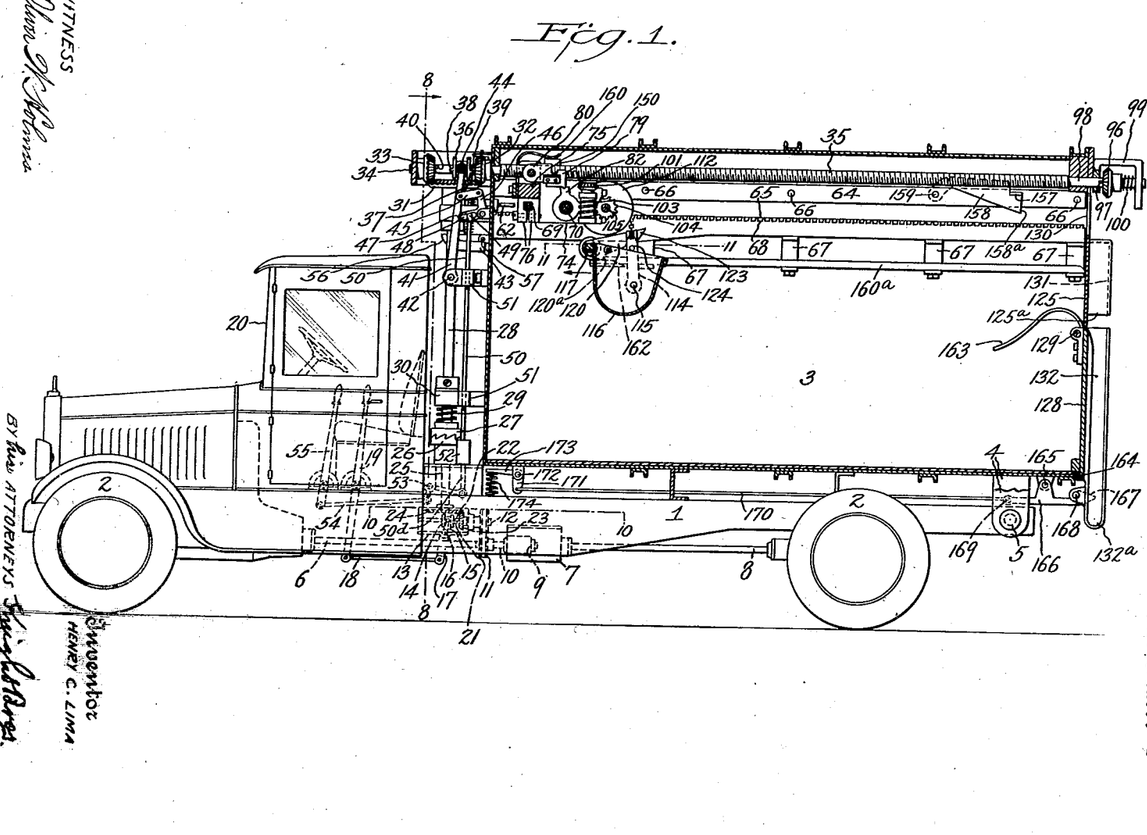
Figure 1 is a side elevation of a self-loading truck provided with my improved truck body and conveyor mechanism which are shown in vertical longitudinal section.
Figures 8, 9, 11:
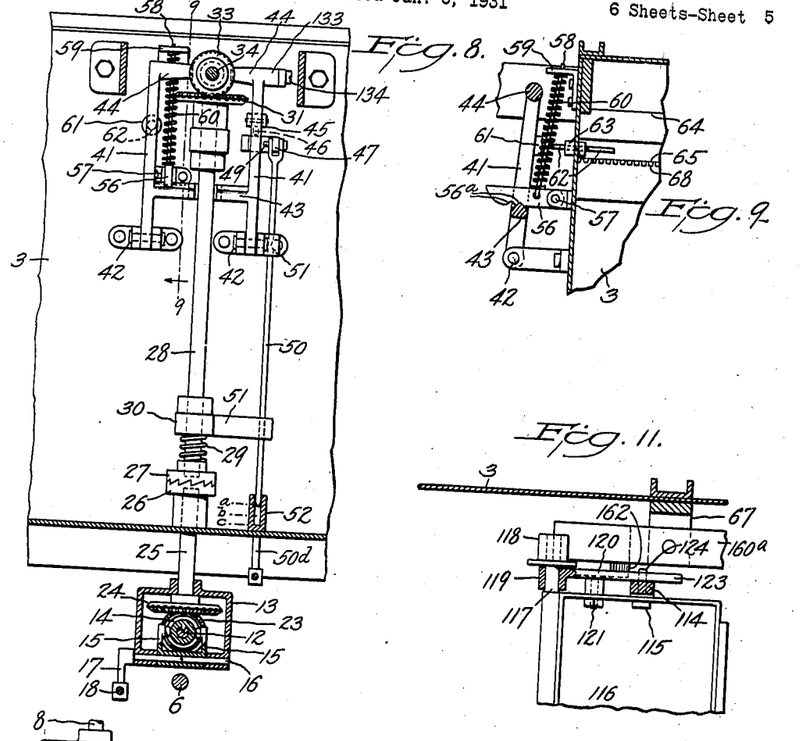
Figure 8 is an enlarged vertical transverse section on the line 8—8 of Figure 1 showing the driving connections in front elevation, parts being shown in elevation.
Figure 9 is a fragmentary section on the line 9—9 of Figure 8, parts being shown in side elevation.
Figure 11 is an enlarged fragmentary section on the line 11—11 of Figure 1, parts being shown in plan.
Figure 10:
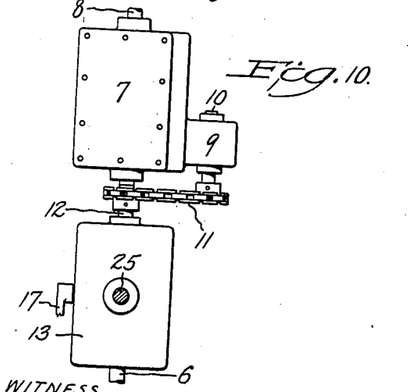
Figure 10 is an enlarged fragmentary horizontal section corresponding to the line 10—10 of Figure 1 and showing in top plan view the power take-off.

According to the embodiment of my invention shown on the drawings, the chassis frame 1 of an automobile truck is provided with wheels 2. A truck body 3 which is mounted upon the chassis frame 1, is provided near its rear end with a heavy bar support 4 having its outer ends deflected downwardly and pivotally connected on an axis 5 to the rear end of the chassis frame 1. Said body is thus adapted to be swung upwardly and downwardly about the axis 5 by any suitable elevating mechanism (not shown on the drawings). An engine shaft 6 shown in dotted lines on Figure 1 of the drawings, is connected through a transmission 7 with a shaft 8 which drives the rear axle of the truck. As shown best in Figure 10 of the drawings, the transmission 7 is provided with a laterally-projecting housing 9 for a power take-off shaft 10 which is connected by a sprocket chain 11 with a clutch shaft 12 journalled in a clutch housing 13. Splined to the clutch shaft 12 as shown in Figures 1 and 8 of the drawings, is a clutch block 14 which may be shifted by a bifurcated arm 15 keyed to a rock-shaft 16, said rock-shaft being provided with a depending arm 17 connected by a rod 18 to the lower arm of a hand-operated shift lever 19 which is located in the cab 20 of the truck. As shown in Figure 1, the clutch block 14 carries an axially-presented pin 21 which is adapted to engage with another pin 22 which projects axially from a bevel pinion 23, said pinion 23 being keyed to the clutch shaft 12 and meshing with a larger bevel gear 24 which is keyed to the lower end of a short section 25 of a vertical power shaft. A lower clutch element 26 keyed to the upper end of short section 25, is adapted to separably engage an upper clutch element 27 which is splined to the lower end of an upper section 28 of said vertical power shaft, the resilient pressure of a compression spring 29 which is interposed between the upper clutch element 27 and a bearing 30 within which the shaft 28 is journalled, being adapted to yieldably retain said clutch elements in engagement. As shown best in Figure 8, the upper end of shaft 28 carries a large bevel gear 31 which, as shown in Figure 1, is permanently in mesh with coaxially-arranged bevel gears 32 and 33 which are freely journalled upon the forward end 34 of a screw shaft 35, said screw shaft being journalled at opposite ends in suitable bearings mounted upon the front and rear ends of the automobile body 3. Splined to the reduced forward end 34 of the screw shaft 35 is a clutch block 36 provided with oppositely-presented clutch pins 37 and 38, the former being adapted to engage a clutch pin 39 carried by the bevel gear 32 and the latter being adapted to engage a clutch pin 40 carried by the bevel gear 33. In the position of clutch block 36 shown in Figure 1, the screw shaft 35 is rotated continuously in a direction to impart a forward movement to a travelling crane or carriage hereinafter referred to, while in its extreme opposite position, said clutch block is adapted to transmit a movement in the opposite direction. As shown in Figure 8 of the drawings, a substantially H-shaped clutch-shifting frame or lever comprises laterally-spaced side bars 41 with their lower ends pivoted at 42 upon the front wall of the truck body, a cross bar 43 rigidly connecting said side bars and two inwardly presented arms 44 which engage the clutch block or spool 36. A connecting link 45 (see Figure 1) is pivotally connected at one end to one of the side bars 41 of the clutch lever and at its other end is pivotally connected to one arm 46 of a bell crank lever, the other arm 47 of said bell crank lever being provided with a slot 48 within which moves a pin 49 mounted in the upper end of an upper rod section 50 which is reciprocably mounted in brackets 51. Mounted on the upper end of a lower rod section 50$d$, is a lost-motion coupling or socket 52. As shown in Figure 1 the lower section 50$d$ of the connecting rod is pivotally connected to one arm of a bell crank lever pivoted at 53, the other arm of said bell crank lever being connected by a link 54 to a shift lever 55 located within the cab 20. With the clutch block 36 in the position shown in Figure 1, the lower extremity of upper section 50 will be located at "$a$" within the socket or coupling 52 as shown in Figure 8. With the clutch block 36 in neutral position or midway between the bevel gears 32 and 33 according to Figure 1, the lower extremity of said upper section 50 will be located at "$b$". When said clutch block is in its extreme forward position and in driving connection with the bevel gear 33, the lower extremity of upper section 50 will be located at "$c$" in the socket or coupling 52. It will be understood from this description that the socket or coupling 52 can operate only by a thrust upon the upper section 50 and hence cannot move the clutch block 36 from its forward drive position shown in Figure 1. Suitable means for reversing the forward drive are hereinafter described.

As shown in Figure 9 of the drawings, the cross bar 43 of the clutch shift lever is provided with a wedge-shaped upper edge which is adapted to interlock in alternation with notches 56$a$ in the lower edge of a detent arm 56, said detent arm being pivotally mounted at 57 upon the front wall of the truck body. A spring rod 58 which is pivotally connected at its lower end to the detent arm 56, has its upper end slidably mounted in a fixed bracket 59. Interposed between the bracket 59 and detent arm 56 is a compression spring 60. As shown in Figures 8 and 9, one arm 41 of the shift lever contacts with an enlarged head 61 of a push rod 62 which is reciprocable in a guide 63 in the front wall of the body. The push rod 62 is suitably arranged to be engaged by the carriage of a traveling crane at the end of its forward movement in the manner to be hereinafter described.

Figure 2:
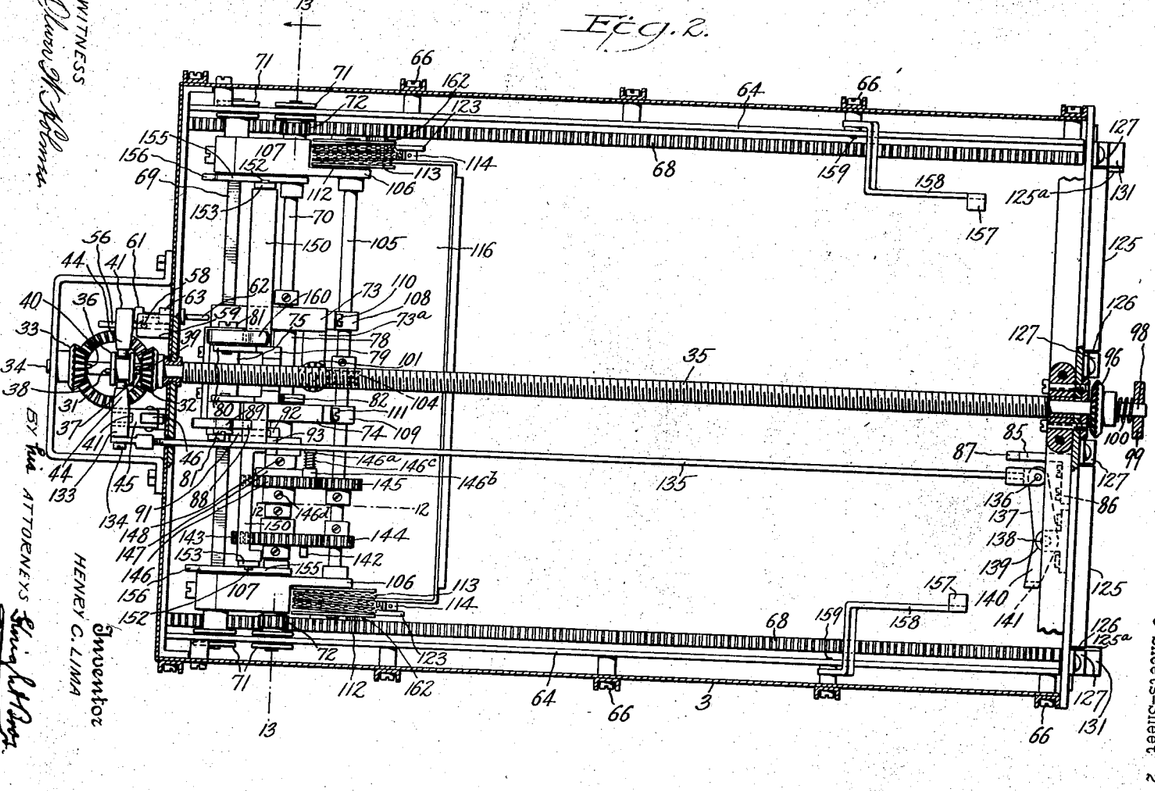
Figure 2 is an enlarged horizontal section of the truck body with the conveyor mechanism shown in plan.
Figures 3, 4, 5:
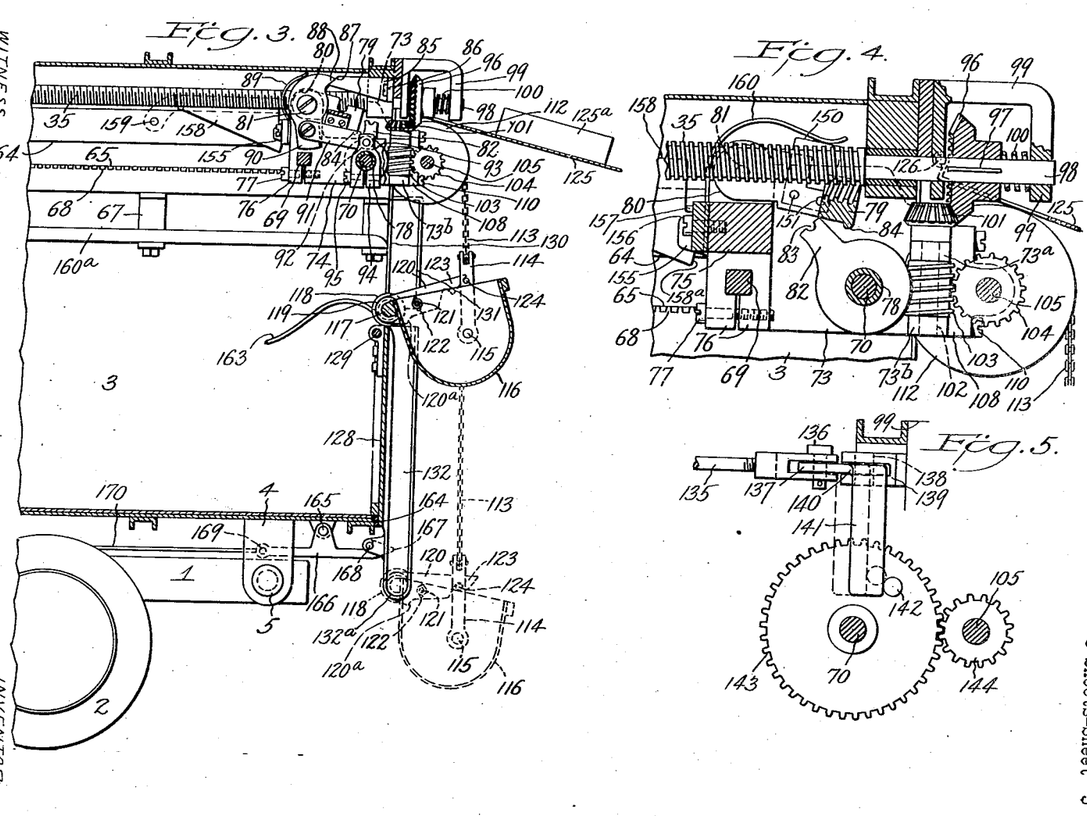
Figure 3 is a vertical longitudinal section of the rear end of the truck body and conveyor mechanism with the carriage in its rearmost position and showing the relative positions of the conveyor parts as the trough-like receptacle is being lowered into position to be loaded.
Figure 4 is an enlarged vertical section taken through the axis of the conveyor screw, parts being broken away and parts shown in elevation.
Figure 5 is an enlarged fragmentary vertical section of the carriage in rearmost position and with rear portions of the clutch-shifting device shown in their operative relations with respect thereto.
Figure 6:
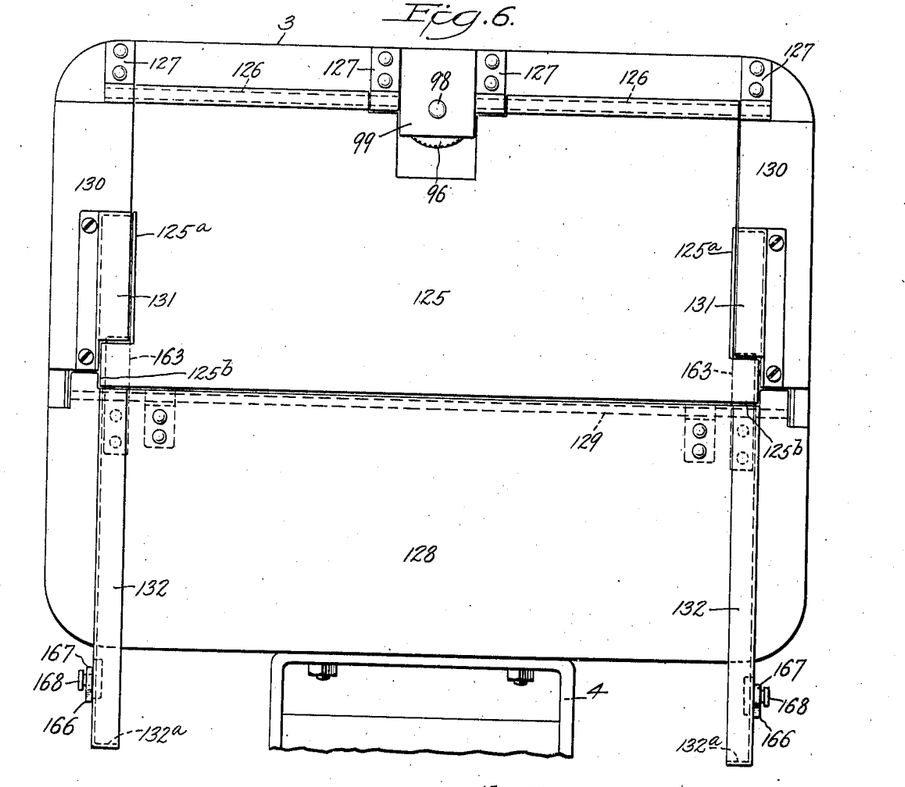
Figure 6 is an enlarged rear end elevation of the truck body with the doors closed.
Figure 7:
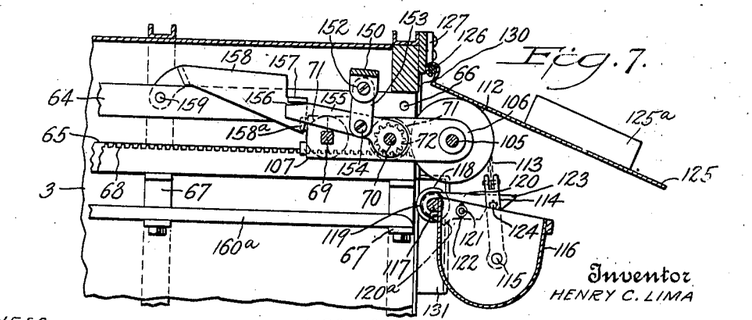
Figure 7 is a vertical longitudinal section of the upper rear end portion of the truck body with the carriage in its rearmost position and with the trough-like receptacle in raised position just before the carriage detent arms are raised for permitting a forward movement of the traveling crane.
Figure 12:
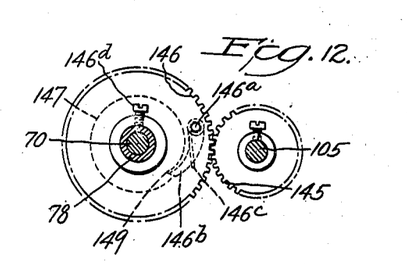
Figure 12 is an enlarged fragmentary section on the line 12—12 of Figure 2.
Figure 13:
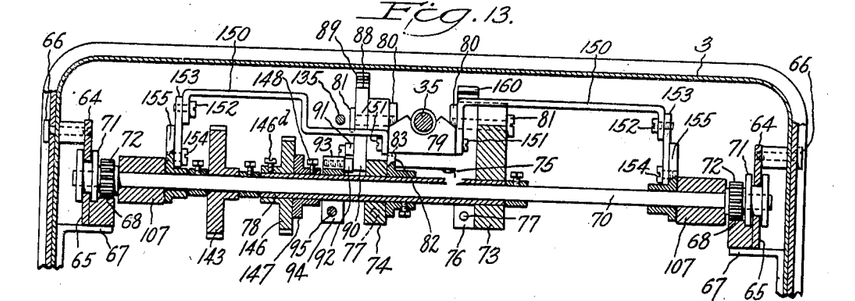
Figure 13 is an enlarged vertical transverse section on the line 13—13 of Figure 2.
Figure 14:
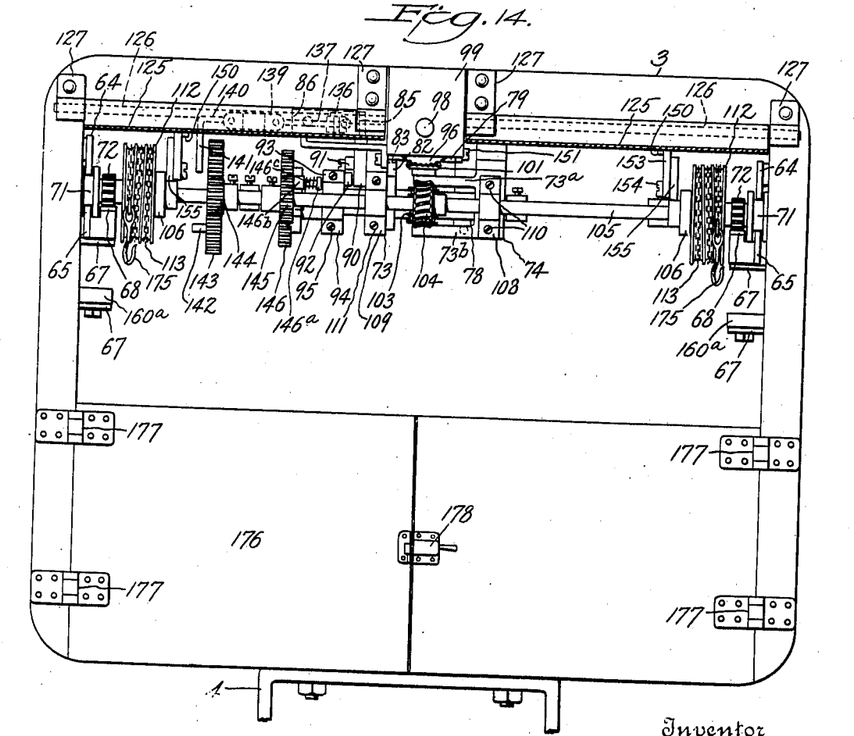
Figure 14 is an enlarged rear end elevation of the truck body with the carriage in rearmost position and the upper door raised, the receptacle being removed and replaced by attachment hooks.

Referring now to Figures 2, 4, 13 and 14, upper and lower track bars 64 and 65 are secured to and spaced from the opposite side walls of the truck body by means of screws or studs 66, the lower track bars 65 being mounted upon a series of supporting brackets 67. Adjacent to and on the inner side of each of the lower track bars 65 is a rack bar 68 which is also carried by the brackets 67. As shown in Figure 2, a shaft 69 of rectangular cross-section extends transversely of the truck body and projects at opposite ends between the track bars 64 and 65. Arranged parallel thereto and also extending between the track bars 64 and 65 is a shaft 70 of circular cross-section. Journalled upon the opposite ends of each of these shafts are carriage-supporting rollers 71 which are guided in their forward and rearward movements by the track bars 64 and 65. Mounted upon the circular shaft 70 on the inner sides of rollers 71 are spur gears 72 which respectively mesh with the rack bars 68 and serve to constrain the opposite ends of said shaft to move in unison along the track bars. Carried by the shafts 69 and 70 on opposite sides of the screw shaft 35, are laterally-spaced plates 73 and 74 which are integrally connected at their forward edges by a cross bar 75; said plates and cross bar being rigidly mounted on the shaft 69 by split bearings 76 which are drawn into clamping engagement with the shaft 69 by means of screws 77. As shown in Figure 13, a sleeve 78 which is journalled on the shaft 70 rotates in the laterally-spaced plates 73 and 74. Means for releasably connecting the carriage to the continuously rotating screw shaft 35 may be provided as follows: Arranged between the laterally-spaced plates 73 and 74 is a threaded block 79 which is adapted to be moved into and out of running engagement with the screw shaft 35. For this purpose, said threaded block is provided with integrally-formed arms 80 which are pivotally mounted upon suitable studs 81 which are mounted in bearing lugs on the side plates 73 and 74. Secured to the sleeve 78 is an operating arm 82 which is provided in its outer end with a notch 83 which is adapted to move into and out of holding engagement with a lug 84 on the under side of the screw block 79. As shown in Figures 2 and 3 of the drawings, a fixed bracket 85 has its base plate 86 secured to the inner face of the rear top rail of the truck body, said bracket being provided with a beveled forward end 87 which as shown in Figure 3 is adapted to intercept a radial projection 88 on a cam lever which is pivoted on one of the studs 81, said cam lever being provided with a leaf spring 89 tending to resist its movement in an anti-clockwise direction. This cam lever is provided with a depending arm 90 which carries a thrust rod 91 movably engaging a roller 92 (see Figure 13) carried by a radial arm 93 which is provided with a split lug 94 by which said arm is clamped to the sleeve 78 by means of a screw 95. It will be understood from this description that as the cam lever comes into engagement with the fixed bracket 85, the notched arm 82 is moved from under the screw block 79 in a clockwise direction, according to Figure 4, thus permitting the screw block to fall away from the screw shaft 35. This action permits the carriage to come to rest in its rearmost position, as shown in Figure 3. At the same time, the hoisting mechanism is connected up to the screw shaft 35 by means of a bevel gear 96 which is non-rotatably connected by a spline 97 to the reduced end 98 of the screw shaft, said reduced end being journalled in a fixed bracket 99. As shown best in Figure 4, a spring 100 which is interposed between the bevel gear 96 and bracket arm 99, is adapted to yieldably support said bevel gear as a smaller bevel gear 101 is moved into mesh therewith at the end of the carriage movement. Said bevel gear 101 is keyed to the upper end of a short vertical shaft 102 which is journalled in the inwardly-presented arms 73a and 73b of the side plate 73. Keyed to the short shaft 102, is a worm 103 which meshes into a worm gear 104, said worm gear being keyed to a cross shaft 105. As shown in Figure 2, the cross shaft 105 is journalled in rearwardly-presented plates 106 on the laterally-spaced supporting blocks 107 and constitutes the hoisting drum shaft. Suitable bearing caps 108 and 109 for supporting the hoisting drum shaft on opposite sides of the worm gear, may be secured by bolts 110 and 111 to the ends of side plates 73 and 74. Keyed to the outer ends of the rotary shaft 105 are oppositely-arranged chain-winding drums 112 which serve to wind and unwind the chains 113, said chains being connected at their lower ends to suspension links 114 within the lower ends of which is pivotally suspended on an axis 115 a trough-like receptacle 116 which is preferably constructed to extend completely across the rear end of the truck body. By an inspection of Figure 3 it will be seen that the receptacle 116 is eccentrically suspended with respect to its centre of gravity and is therefore under a tendency to overturn by an anti-clockwise movement on its axis 115. Suitable means for preventing this overturn until the proper point for dumping the load has been reached, may be provided as follows, reference being had more especially to Figure 11. Secured to the forward edge of the receptacle 116 is a transverse rod 117 and journalled upon the outer ends of said rod are flanged rollers 118 which are adapted to travel on suitable guides or track bars to be presently referred to. Pivotally mounted upon each end of rod 117 between the end of the receptacle 116 and the roller 118, is the hub portion 119 of a latch bar 120 which carries an inwardly-presented pin 121 having a limited movement in a slot 122 in the end wall of the receptacle 116. The outer end of each of the latch bars 120 is provided with a hook 123 which under the action of gravity is adapted to fall into engagement with a pin 124 which projects from the link 114, the beveled surface on the outer end of said hook end adapting the hook to slide over said pin during the angular movement of said receptacle 116 into upright position. Said receptacle is thus retained in upright position during its downward movement into loading position and during its subsequent upward and forward movement to a predetermined point at which it dumps, at which time the latch bars 120 are automatically lifted from the pins 124 in the manner hereinafter referred to. As shown in Figure 6 of the drawings, the rear end of the truck body is normally closed by an upper door 125 which swings from transverse rods 126 carried by strap bearings 127 and a lower door 128 which swings about a transverse bar 129. As indicated in Figure 7, the upper door 125 is adapted and arranged to be engaged by the peripheral edges of the chain drums 112 after a preliminary displacement of said door by the rear edge of the receptacle 116 as the carriage approaches its rearmost position. Secured to the vertical side frames 130 are laterally-spaced guides or tracks 131 which limit the rearward movement of the receptacle 116 and constrains said receptacle during the early portion of its downward movement. According to this embodiment of my invention, the lower swinging door 128 is normally retained in closed position by suitable releasable latches to be presently referred to. As shown best in Figures 3 and 6, the lower door 128 is provided with vertical guides or tracks 132 which in effect constitute continuations of the guides or tracks 131 so that the rollers 118 as they move downwardly are brought to rest at the lower ends 132a of said guides. As said receptacle reaches this, its loading position, the power transmission for screw 35 is automatically interrupted in the following manner. As shown in Figures 2 and 8, a laterally-presented portion 133 of the clutch-shifting arms 44, carries a stud 134 to which is pivotally connected at its forward end a long connecting rod 135. The rear end of connecting rod 135 is pivotally connected at 136 to one arm 137 of a bent lever pivoted at 138 in a fixed bracket 139, the other arm 140 of said lever being provided with a depending end 141 arranged in the path of a pin 142 which projects laterally from a spur gear 143 which is freely journalled upon the cross shaft 70 and meshes into a smaller spur gear 144 on the shaft 105. The construction and relative arrangement of the parts are such that when the bevel gear 101 comes into mesh with the bevel gear 96 in the rearmost position of the carriage, the rotation of shaft 105 will operate through gears 144 and 143 to revolve the pin 142 into engagement with the arm 141 and thus serve to throw the clutch block 36 into neutral position. This action automatically interrupts the power connection between the vertical drive shaft 28 and the screw shaft 35 and all of the parts thus brought to rest remain at rest until the shift lever 55 in the cab is operated to restore this power connection after the receptacle 116 has been filled. The movement will now be reversed for raising the receptacle and conveying it forwardly into the truck body. Referring more especially to Figures 12, 13 and 14, it will be understood that the operation of screw shaft 35 in a reverse direction will cause the receptacle 116 to be lifted from its dotted line position as shown in Figure 3 by a counter-clockwise rotation of the drum shaft 105. Keyed to the drum shaft 105 is a spur pinion 145 which meshes with a gear 146, this gear being secured to the sleeve by a set screw 146d, as shown in Figure 12. The spur gear 146 carries a stud 146a upon which is pivoted a pawl 146b, said pawl being pressed by a spring 146c into engagement with a disk 147 which is keyed to the sleeve 78 by means of a set screw 148. As shown in dotted lines in Figure 12, the disk 147 is provided with a shoulder 149 against which the pawl 146b is driven by the clockwise rotation of gear 147. As the sleeve 78 is thus rotated in the same direction, the notched finger 82 is revolved from its position shown in Figure 3 around to its position shown in Figure 4, reaching the latter position at about the time that the receptacle 116 reaches the top of its vertical movement. The continuing movement of the notched finger 82 causes it to engage the under side of screw block 79 and thus raises it into engagement with the screw shaft 35 whereupon the traveling crane begins its forward movement. It will be understood from this description that while the receptacle 116 is being lowered, the gear 146 will be rotated in a counter-clockwise direction so that pawl 146b drags over the periphery of disk 147 without rotating the sleeve 78. Referring now to Figure 13, oppositely-arranged straps or bars 150 are connected at their inner ends by screws 151 to the opposite sides of the screw block 79. The outer end of each of said straps or bars 150 is connected by a screw 152 to one end of a link 153, the other end of said link being connected by a screw 154 to a cam arm 155 shown best in Figure 7, said cam arm being freely pivoted on the transverse shaft 70 and provided with a beveled outer surface 156 which is disposed below an inwardly-presented flange 157 on a bent lever arm 158 which is pivoted at 159. A leaf spring 160 which as shown in Figure 4 is arranged to bear downwardly on the upper surface of the strap or bar 150 to hold the arm 155 in depressed position and thus permits the bent arms 158 to drop into locking position with respect to the forward edges of the laterally-spaced blocks 107 of the carriage. For this purpose, each of the bent arms 158 is provided with a vertical flange 158a which positively locks the carriage in its rearmost position when the screw block 79 drops to release position as shown in Figure 4. As said screw block is lifted, however, the cam arms 155 engage under the flange 157 and thus elevate the locking flanges 158a out of the path of the carriage on its forward movement as the screw block 79 is brought into clutch with the screw shaft 35. This happens immediately after the receptacle 116 reaches its position as shown in Figure 7, the carrying rollers 118 therefor being then arranged in alinement with laterally-spaced track bars 160a which as shown in Figures 1 and 14 are rigidly mounted by brackets 67 arranged along the lateral walls of the truck body. As the carriage moves forwardly to its position shown in Figure 1, the rollers 118 are brought into engagement with laterally-spaced cam blocks 162 which operate to lift the latch hooks 123 out of engagement with the pins 124 on the suspension links 114 and immediately thereafter as the rollers drop from the forward edge of the track bars 160a, the receptacle 116 is dumped by gravity at the forward end of the truck body or if the forward end of the truck body is full, it will drag over the material until a vacant space is reached when the dumping action takes place. At about the time that the rollers 118 drop from the rear edges of the cam blocks 162, the forward edge of one of the split socket blocks 76 comes into engagement with the push rod 62 shown in Figures 1 and 9, whereupon the clutch shift frame 41 is moved forwardly for automatically reversing the direction of rotation of the screw shaft 35. This action starts the traveling crane rearward again for another load. Near the end of this return movement, the rollers 118 which are now depending below the track bars 160a come into engagement with laterally-spaced guide bars 163. As the rollers are drawn upwardly over these guide bars, the receptacle 116 is moved into upright position, and the latch hooks 123 drop into engagement with the locking pins 124 preparatory to another downward movement of the vessel 116 to loading position.

As explained above, the tail gate or lower door 128 is adapted to swing about a transverse rod or hinge 129 under the action of gravity when the forward end of the truck body is raised. In order to make the lower door 128 substantially fluid-tight, a gasket or packing strip 164 may be arranged between the lower door 128 and the adjacent edge of the truck floor, said door being normally held tight against its seat by suitable mechanism now to be described. Pivotally mounted upon a common axis 165 on opposite sides of the truck body is a latch lever 166 which is provided at its rear end with a hook 167 adapted to releasably engage a pin 168 which projects laterally from the depending end of the guide 132 on each side. The forward end of the latch lever 166 is pivotally connected at 169 to one end of a connecting rod 170, the forward end of said rod being connected to a depending arm 171 of a bell crank lever which is pivoted at 172 in a fixed bracket mounted on the under side of the truck body floor. The other arm 173 of said bell crank lever is adapted in the lower position of the truck body to be engaged by a compression spring 174 which acts to retain the latch lever 166 in latching engagement with the pin 168. It will be understood, however, that whenever the truck body is raised at the forward end, the pressure on arm 173 will be released and permit a movement of the latch lever 166 on its pivot 165 accompanied by a pivotal movement at 169 in such a way as to permit the tail gate 128 to swing outwardly under the action of gravity as the truck body moves upwardly to dump the load from the rear end of the truck body.

According to the embodiment of my invention shown in Figure 14, the loading receptacle has been removed and suspension hooks 175 have been connected to the ends of the chains 113. The hooks 175 with the receptacle 116 removed adapt the hoisting mechanism of the traveling crane to be employed for loading articles of various kinds. A further modification consists in the substitution of two outwardly-opening doors 176 which swing on hinges 177 and in closed position may be locked together by some suitable latch or locking device 178.

I claim:—

1. In a self-loading truck, the combination with a truck, of a traveling carriage mounted thereon, hoisting mechanism mounted on said carriage, reversible power-transmitting mechanism for supplying power to said carriage and hoisting mechanism, means for releasably connecting said carriage to said power-transmitting mechanism, means for releasably connecting said hoisting mechanism to said power-transmitting mechanism, carriage-controlled means for moving both of said power-connecting means into and out of power-transmitting position, upright guides at the rear end of the truck, a receptacle guided for vertical movement in said guides to and from the carriage, and means connecting said hoisting means to the receptacle.

2. In a self-loading truck, the combination with a truck, of a traveling carriage mounted thereon, hoisting mechanism mounted on said carriage, reversible power-transmitting mechanism for supplying power to said carriage and hoisting mechanism, means for releasably connecting said carriage to said power-transmitting mechanism, means for releasably connecting said hoisting mechanism to said power-transmitting mechanism, carriage-controlled means for moving both of said power-connecting means into and out of power-transmitting position, means operated by said carriage at the end of its forward movement for reversing said power-transmitting mechanism, upright guides at the rear end of the truck, a receptacle extending transversely of the truck and guided for vertical movement in said guides, and means connecting said hoisting means to the receptacle.

3. In a self-loading truck, the combination with a truck, of a traveling carriage mounted thereon, hoisting mechanism mounted on said carriage, reversible power-transmitting mechanism for supplying power to said carriage and hoisting mechanism, means for releasably connecting said carriage to said power-transmitting mechanism, means for releasably connecting said hoisting mechanism to said power-transmitting mechanism, carriage-controlled means for moving both of said power-connecting means into and out of power-transmitting position, means operated by said hoisting mechanism at the bottom end of its movement for stopping said power-transmitting mechanism, upright guides at the rear end of the truck, a receptacle extending transversely of the truck and guided for vertical movement in said guides, and means connecting said hoisting means to the receptacle.

4. In a self-loading truck, the combination with a truck, of a traveling carriage movable outwardly and inwardly thereon, hoisting mechanism mounted on said carriage, reversible power-transmitting mechanism for supplying power to said carriage and hoisting mechanism, means operable at the outer end of the carriage movement for disconnecting and connecting said carriage to said power-transmitting mechanism, means operable at the outer end of the carriage movement for releasably connecting said hoisting mechanism to said power-transmitting mechanism, means operated by said hoisting mechanism at the bottom end of its downward movement for stopping said power-transmitting mechanism, upright guides at the rear of the truck, horizontal guides extending forwardly from the rear end of the truck, a receptacle extending transversely of the truck and including means guided for vertical movement in the upright guides and for movement longitudinally of the truck on the horizontal guides, and means connecting the hoisting means to the receptacle.

5. In a self-loading truck, the combination with a truck, of a traveling carriage mounted thereon, hoisting mechanism mounted on said carriage, reversible power-transmitting mechanism for supplying power to said carriage and hoisting mechanism, means for releasably connecting said carriage to said power-transmitting mechanism, means operable at the outer end of the carriage movement for releasably connecting said hoisting mechanism to said power-transmitting mechanism, means operated by said hoisting mechanism at the bottom end of its downward movement for stopping said power-transmitting mechanism, means operated by said carriage at the end of its forward movement for reversing said power-transmitting mechanism, upright guides at the rear of the truck, horizontal guides extending forwardly from the rear end of the truck, a receptacle extending transversely of the truck and including means guided for vertical movement in the upright guides and for movement longitudinally of the truck on the horizontal guides, and means connecting the hoisting means to the receptacle.

6. In a self-loading truck, the combination with a truck, of a traveling carriage movable longitudinally of said truck, hoisting mechanism mounted on said carriage, reversible power-transmitting means extending along the path of said carriage, means for releasably connecting said carriage to said power-transmitting means, a rock-shaft mounted on said carriage for controlling its power-connections with said power-transmitting means, means operated by said carriage for moving said rock-shaft to break said power-transmitting connections, means operated by said hoisting mechanism for re-establishing said power-transmitting connections, upright guides at the rear of the truck, horizontal guides extending forwardly from the rear end of the truck, a receptacle extending transversely of the truck and including means guided for vertical movement in the upright guides and for movement longitudinally of the truck on the horizontal guides, and means connecting the hoisting means to the receptacle.

7. In a self-loading truck, the combination with a truck, of a traveling carriage movable outwardly and inwardly thereon, hoisting mechanism mounted on said carriage, reversible power-transmitting means for supplying power to said carriage and hoisting mechanism, a releasable connection between said carriage and said power-transmitting means, a releasable connection between said hoisting mechanism and said power-transmitting means, the last-mentioned releasable connection comprising driving and driven parts respectively included in said power-transmitting means and said hoisting mechanism and moved into and out of connection by the movement of said carriage, means operated by said carriage at the end of its outward movement for releasing its power-transmitting connection, means operated by said hoisting mechanism at the top of its upward movement for restoring the connection between said power-transmitting means and said carriage, upright guides at the rear of the truck, horizontal guides extending forwardly from the rear end of the truck, a receptacle extending transversely of the truck and including means guided for vertical movement in the upright guides and for movement longitudinally of the truck on the horizontal guides, and means connecting the hoisting means to the receptacle.

8. In a self-loading truck of the character described, the combination with the truck body, of a traveling crane comprising a longitudinally movable carriage and hoisting mechanism mounted thereon, power-transmitting connections adapted to be separately connected up with said carriage and hoisting mechanism, means operated by said carriage at the end of its rearward movement for automatically disconnecting the power connection with said carriage and connecting up the power connections with said hoisting mechanism, means operated by the carriage at the end of its forward movement for reversing the direction of drive of said power-transmitting connections, upright guides at the rear of the truck, horizontal guides extending forwardly from the rear end of the truck, a receptacle extending transversely of the truck and including means guided for vertical movement in the upright guides and for movement longitudinally of the truck on the horizontal guides, and means connecting the hoisting means to the receptacle, and means for automatically discharging the load at the end of said forward movement of the carriage.

9. In a self-loading truck of the character described, the combination with a reversibly driven screw, of a traveling crane comprising a longitudinally movable carriage and hoisting mechanism mounted thereon, a screw block movable on said carriage into and out of engagement with said screw, means operated by the movement of said carriage for automatically disconnecting said screw block from said screw, a driving gear mounted on the rear end of said screw, a driven gear connected to said hoisting mechanism and movable into mesh with said driving gear at the end of the rearward movement of said carriage, means operated by the carriage for reversing the direction of said screw at the end of the forward movement of said carriage, and means operated by said hoisting mechanism for moving said screw block into engagement with said screw.

10. In a self-loading truck, the combination of a screw shaft of a carriage movable forwardly and rearwardly with respect to said truck, said carriage being provided with a screw block movable into and out of engagement with said screw shaft, hoisting mechanism mounted on said carriage, said hoisting mechanism being provided with releasable means for connecting it up with said screw shaft, means operated by the rearward movement of said carriage for disconnecting said screw block from said screw and connecting said hoisting mechanism connecting means to said screw, and carriage-locking means operated by said screw block disconnecting means.

11. In a self-loading truck, the combination of a screw shaft, of a carriage movable forwardly and rearwardly with respect to said truck, said carriage being provided with a screw block movable into and out of engagement with said screw shaft, hoisting mechanism mounted on said carriage, said hoisting mechanism being provided with releasable means for connecting it up with said screw shaft, means operated by the rearward movement of said carriage for disconnecting said screw block from said screw, carriage-locking means operated by said screw block disconnecting means, and means operated by said hoisting mechanism for releasing said carriage-locking means and returning said screw block to screw-engaging position 12. In a self-loading truck, the combination of a screw shaft, of a carriage movable forwardly and rearwardly with respect to said truck, said carriage being provided with a screw block movable into and out of engagement with said screw shaft, hoisting mechanism mounted on said carriage, said hoisting mechanism being provided with releasable means for connecting it up with said screw shaft, means operated by the rearward movement of said carriage for disconnecting said screw block from said screw, means operated by said hoisting mechanism for arresting the motion of said screw, other means operated by said hoisting mechanism for restoring the connection between said screw block and said screw, and means operated by the forward movement of said carriage for reversing the direction of said screw.

13. In a self-loading truck, the combination of a screw shaft, of a carriage movable forwardly and rearwardly with respect to said truck, said carriage being provided with a screw block movable into and out of engagement with said screw shaft, hoisting mechanism mounted on said carriage, said hoisting mechanism being provided with power-transmitting connections adapted to be connected to said screw shaft at the end of the rearward movement of said carriage and to be disconnected therefrom by the forward movement of said carriage, means actuated by the rearward movement of said carriage for disconnecting said screw block from said screw, and a one-way driving connection between said hoisting mechanism power-transmitting connections and said screw block actuating means for returning said screw block to screw-engaging position.

14. In a self-loading truck, the combination with a conveyor screw, of a power-transmitting clutch movable to forward drive, neutral, and reverse drive positions, positions with respect to said conveyor screw, a traveling carriage movable forwardly and rearwardly with respect to said truck, hoisting mechanism mounted on said carriage, a conveyor receptacle suspended from said hoisting mechanism, means for releasably connecting said carriage to said conveyor screw during its forward and reverse movements, means for releasably connecting said conveyor screw to said hoisting mechanism during the intervals of time when said conveyor screw is disconnected from the carriage, and means operated by said carriage for disconnecting it from said conveyor screw and for connecting said hoisting mechanism to said conveyor screw, means operated by the hoisting mechanism in a predetermined position of said conveyor receptacle for moving said clutch to neutral position.

15. In a self-loading truck, the combination of a conveyor screw, a traveling carriage movable forwardly and rearwardly on said truck, hoisting mechanism mounted on said carriage, a conveyor receptacle eccentrically suspended from said hoisting mechanism, tracks for guiding said conveyor receptacle vertically and horizontally, said receptacle being provided with latches for holding it in upright position, means for releasably connecting said carriage to said conveyor screw, means for reversing the direction of rotation of said conveyor screw at the end of the forward movement of said carriage, means for releasing said carriage connecting means at the end of the rearward movement of said carriage, and means for releasably connecting said conveyor screw to said hoisting mechanism during the intervals of time when said conveyor screw is disconnected from the carriage, said guiding tracks being provided with cam blocks for releasing said latches at the forward end of travel of said carriage.

16. In a self-loading truck, the combination with a truck body, of a conveyor screw arranged near the top of said truck body and in the central vertical longitudinal plane thereof, a vertical power shaft, a clutch for transmitting power from said power shaft to said conveyor screw, said clutch having forward, neutral, and reverse positions, a traveling carriage movable forwardly and rearwardly within the truck body, hoisting mechanism mounted on said carriage, a conveyor receptacle suspended from said hoisting mechanism, means for releasably connecting said carriage to said conveyor screw during its forward and reverse movements, and means for releasably connecting said conveyor screw to said hoisting mechanism during the intervals of time when said conveyor screw is disconnected from the carriage.

17. In a self-loading truck, the combination with a truck body, of a conveyor screw, a traveling carriage movable forwardly and rearwardly within the truck body, a conveyor receptacle movable rearwardly and forvardly by said carriage, hoisting mechanism mounted on said carriage, said conveyor receptacle being suspended from said hoisting mechanism to be lowered and raised thereby, means for releasably connecting said carriage to said conveyor screw during its forward and reverse movements, means for releasably connecting said conveyor screw to said hoisting mechanism during the intervals of time when said conveyor screw is disconnected from the carriage, means for stopping the rotation of said conveyor screw in the lowered position of said conveyor receptacle, and means for dumping said conveyor receptacle at the end of the forward movement of said carriage.

18. In a self-loading truck, the combination of a screw shaft arranged longitudinally with respect to said truck, a power driven clutch block movable to forward, reverse and neutral positions, said screw shaft having power connections with said clutch block in forward and reverse positions, a carriage movable forwardly and rearwardly with respect to said truck, said carriage being provided with a screw block movable into and out of engagement with said screw shaft, a rock shaft for operating said screw block, hoisting mechanism mounted on said carriage, said hoisting mechanism being provided with geared connections for connecting it up with said screw shaft in the rear extreme position of said carriage, a receptacle suspended from said hoisting mechanism, fixed guides for said receptable, said guides supporting said receptacle at a distance from its axis of suspension, and means operated by the forward movement of said carriage for reversing the direction of said screw shaft, said supporting guides being terminated near the forward extreme of the carriage movement.

19. In a self-loading truck, the combination with a truck body, of a conveyor screw extending longitudinally of said truck body, laterally-spaced guiding tracks extending longitudinally of said truck body, a traveling carriage reciprocable on said guiding tracks, driving means on the carrier movable into and out of engagement with the screw, hoisting mechanism mounted on said carriage, a conveyor receptacle eccentrically suspended from said hoisting mechanism, said receptacle being provided with roller supports journalled on an axis spaced from the suspension axis of said receptacle, and fixed guides for said roller supports, said fixed guides terminating short of the front wall of the truck body.

20. In a self-loading truck, the combination of power-transmitting mechanism arranged longitudinally with respect to said truck and provided with a clutch block movable to forward, reverse and neutral positions, a loader arranged to receive power from said power-transmitting mechanism, means operated by movement of the loader for shifting said clutch block, and manually operated means for shifting said clutch-block, said latter shifting means including coaxially arranged rod-sections provided with a lost-motion thrust connection.

21. In a self-loading truck, the combination of a screw shaft arranged longitudinally with respect to said truck, a power driven clutch block movable to forward, reverse and neutral positions, said screw shaft having power connections with said clutch-block in forward and reverse positions, a carriage movable forwardly and rearwardly with respect to said truck, said carriage being provided with a screw-block movable into and out of engagement with said screw shaft, hoisting mechanism mounted on said carriage, said hoisting mechanism being provided with geared connections for connecting it up with said screw shaft in the rear extreme position of said carriage and disconnecting it therefrom by the forward movement of said carriage, means operated by the forward movement of said carriage for shifting said clutch-block to reverse position, and hand-actuated means for shifting said clutch-block to forward drive position.

22. In a self-loading truck, the combination with a closed body, of laterally-spaced track-bars arranged within said closed body and extending longitudinally thereof, a travelling crane movable forwardly and rearwardly of the closed body along said track-bars, said closed body being provided with a charging opening and a door movable between open and closed positions with respect to said charging opening, and hoisting mechanism carried by said travelling crane, said travelling crane and the door including cooperating means to control the opening and closing movements of said door.

23. In a self-loading truck, the combination with a closed body provided with a charging opening and a door movable into and out of closed position with respect to said charging opening, of laterally-spaced track-bars arranged within said closed body and extending longitudinally thereof, a travelling crane movable forwardly and rearwardly on said track-bars, said travelling crane and the door including cooperating means whereby the crane on its rearward movement opens said door, and hoisting mechanism mounted on said travelling crane, said hoisting mechanism being arranged on said travelling crane to be presented rearwardly from the closed body of the truck in the rearmost position of said travelling crane.

24. In a self-loading truck, the combination with a closed body, of laterally-spaced track-bars arranged within said closed body and extending longitudinally thereof, and a travelling crane movable forwardly and rearwardly within the closed body and along said track-bars, said closed body being provided with a door movable between open and closed positions, said door and crane including cooperating means whereby movements of the door are under the control of said travelling crane, said travelling crane being provided with hoisting mechanism adapted to be presented rearwardly from the closed body of the truck in the rearmost position of said travelling crane.

HENRY C. LIMA.